United States Patent
Pardo et al.

(10) Patent No.: US 12,147,855 B2
(45) Date of Patent: Nov. 19, 2024

(54) PROCESSOR SUPPORTING VECTORED SYSTEM CALLS

(71) Applicant: MELLANOX TECHNOLOGIES, LTD., Yokneam (IL)

(72) Inventors: Ilan Pardo, Ramat-Hasharon (IL); Evgeny Pimenov, Pardes Hanna Karkur (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/709,475

(22) Filed: Mar. 31, 2022

(65) Prior Publication Data
US 2023/0315547 A1    Oct. 5, 2023

(51) Int. Cl.
G06F 9/54    (2006.01)
G06F 15/82   (2006.01)

(52) U.S. Cl.
CPC ............ G06F 9/546 (2013.01); G06F 15/82 (2013.01)

(58) Field of Classification Search
None
See application file for complete search history.

(56) References Cited

U.S. PATENT DOCUMENTS

| | | | | |
|---|---|---|---|---|
| 6,070,220 A * | 5/2000 | Katayama | ............. | G06F 9/4812 710/262 |
| 6,075,939 A * | 6/2000 | Bunnell | ............. | G06F 9/44521 717/107 |
| 7,835,380 B1 * | 11/2010 | Aloni | ............. | H04L 12/40032 709/239 |
| 2005/0216537 A1 | 9/2005 | Jiang et al. | | |
| 2008/0046725 A1 * | 2/2008 | Lo | ............. | G06F 9/4812 713/165 |
| 2008/0155167 A1 * | 6/2008 | Mansell | ............. | G06F 13/24 711/6 |
| 2015/0007170 A1 * | 1/2015 | Tsirkin | ............. | G06F 9/4486 718/1 |
| 2019/0324755 A1 | 10/2019 | Herr et al. | | |
| 2019/0384909 A1 * | 12/2019 | Ndu | ............. | G06F 21/52 |
| 2020/0159888 A1 * | 5/2020 | Ghose | ............. | G06F 9/3842 |

FOREIGN PATENT DOCUMENTS

| | | | |
|---|---|---|---|
| CN | 102073532 A | 5/2011 | |
| WO | WO 2006132807 A2 * | 12/2006 | ............ G06F 9/44 |

OTHER PUBLICATIONS

Waterman et al., "The RISC-V Instruction Set Manual, vol. I: User Level ISA, Version 2.1," Technical Report No. JCB/EECS-2016-118, Electrical Engineering and Computer Sciences, University of California at Berkeley, pp. 1-133, May 31, 2016.

(Continued)

*Primary Examiner* — Charles E Anya
(74) *Attorney, Agent, or Firm* — MEITAR PATENTS LTD.

(57) ABSTRACT

A processor includes a memory and a processing core. The processing core is configured to define, in the memory, a jump table that is indexed by a service identifier and includes start addresses for respective service identifier values, to receive a system call that specifies a service identifier value, and to serve the system call by executing program code starting from a start address corresponding to the specified service identifier value.

9 Claims, 1 Drawing Sheet

(56) References Cited

OTHER PUBLICATIONS

OSDev Wiki, "Sysenter," pp. 1-4, last modified Jun. 3, 2017, as downloaded from https://web.archive.org/web/20220510174527/https://wiki.osdev.org/Sysenter.
OSDev Wiki, "System Calls," pp. 1-6, last modified Oct. 30, 2021, as downloaded from https://wiki.osdev.org/System_Calls#Sysenter.2FSysexit_.28Intel.29.

* cited by examiner

PROCESSOR SUPPORTING VECTORED SYSTEM CALLS

FIELD OF THE INVENTION

The present invention relates generally to microprocessor design, and particularly to processors supporting vectored system calls.

BACKGROUND OF THE INVENTION

Various types of processors, having various Instruction Set Architectures (ISAs), are known in the art. Some processors use Reduced Instruction Set Computer (RISC) architectures. The ISA of RISC-V processors, for example, is described in "The RISC-V Instruction Set Manual, Volume I: User Level ISA, Version 2.1," May 31, 2016.

SUMMARY OF THE INVENTION

An embodiment of the present invention that is described herein provides a processor including a memory and a processing core. The processing core is configured to define, in the memory, a jump table that is indexed by a service identifier and includes start addresses for respective service identifier values, to receive a system call that specifies a service identifier value, and to serve the system call by executing program code starting from a start address corresponding to the specified service identifier value.

In some embodiments, the processing core is configured to serve the system call by querying the jump table and jumping to the start address corresponding to the specified service identifier value. In some embodiments, prior to querying the jump table, the processing core configured to verify that the specified service identifier value is within a range that does not deviate from the jump table. In an embodiment, upon finding that the specified service identifier value deviates from the jump table, the processing core is configured to jump to the start address corresponding to a last entry of the jump table. In an embodiment, upon finding that the specified service identifier value deviates from the jump table, the processing core is configured to invoke a default system call handler.

In a disclosed embodiment, the processing core is configured to receive the system call by receiving an interrupt and, in response to the interrupt, reading the specified service identifier value from a defined register. In an example embodiment, the processing core is a Reduced Instruction Set Computer (RISC) core.

There is additionally provided, in accordance with an embodiment of the present invention, a network device including a network interface for communicating packets with a network, and a packet processor including a memory and a processing core. The processing core is configured to define, in the memory, a jump table that is indexed by a service identifier and includes start addresses for respective service identifier values, to receive a system call that specifies a service identifier value, and to serve the system call by executing program code starting from a start address corresponding to the specified service identifier value.

There is also provided, in accordance with an embodiment of the present invention, a method for processing system calls in a processor. The method includes defining, in a memory, a jump table that is indexed by a service identifier and includes start addresses for respective service identifier values. A system call, which specifies a service identifier value, is received. The system call is served by executing program code starting from a start address corresponding to the specified service identifier value.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved processors that support vectored invocation of system calls. The embodiments described herein refer mainly to a Reduced Instruction Set Computer (RISC) processor deployed in a network device, by way of example. The disclosed techniques are applicable, however, in various other types processors, systems and use-cases.

In some embodiments, the processor runs kernel-space program code that serves system calls received from user-space. Each system call typically comprises a service identifier (ID) that specifies the requested service. In order to serve system calls with small latency, the kernel-space code defines, in memory, a jump table that is indexed by the service ID. For each valid service ID value, the jump table specifies a respective start address that should be jumped to for serving system calls having that service ID value.

When receiving a system call, the kernel-space code queries the jump table with the service ID value specified in the system call. The kernel-space code serves the system call by executing program code starting from the start address given in the jump table. By invoking system calls using a jump table (a technique that is also referred to as "vectored system call"), the kernel-space code does not need top perform lengthy checks prior to processing a system call, and can start executing the appropriate program code within minimal latency.

In some embodiments, before querying the jump table, the kernel-space code verifies that the specified service ID value is within a defined range that does not deviate from the jump table. This protection mechanism is important for preventing invalid (hostile or innocent) system calls from causing the kernel-space code to jump to memory addresses that are not valid start addresses for serving system calls.

The techniques described herein reduce the latency incurred by system calls. The disclosed techniques are therefore highly beneficial in multi-tasking and/or event-driven applications, one typical use-case being a packet processor in a network device.

System Description

Figure 1:
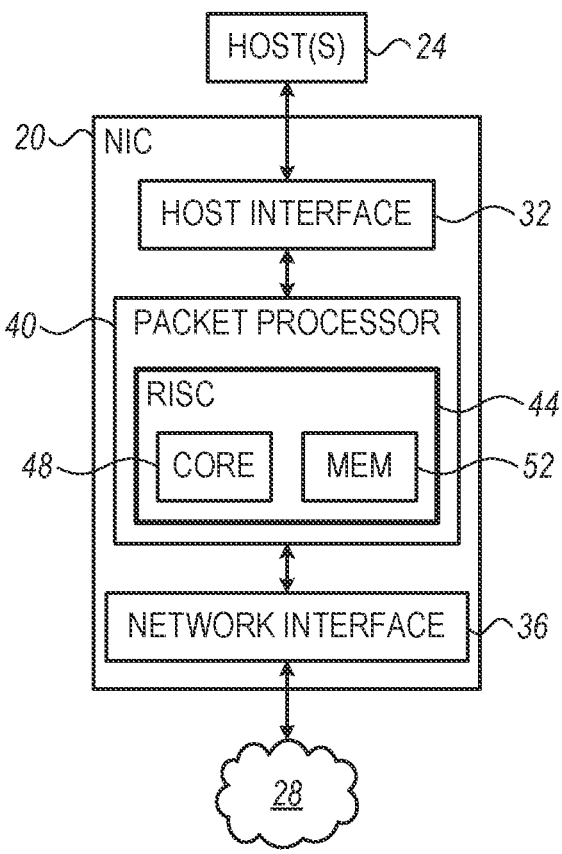
FIG. 1 is a block diagram that schematically illustrates a network device, in accordance with an embodiment of the present invention.

FIG. 1 is a block diagram that schematically illustrates a network device, in the present example a Network Interface Controller (NIC) 20, in accordance with an embodiment of the present invention. NIC 20 connects one or more hosts 24 to a packet network 28 NIC 20 comprises a host interface 32 for communicating with hosts 24, a network interface 36 for communicating with network 28, and a packet processor 40 for performing the various processing tasks of the NIC. Network 28 and NIC 20 may operate in accordance with any suitable network protocol, such as Ethernet of InfiniBand (IB).

In the example of FIG. 1, packet processor 40 comprises, among other components, a RISC 44 that runs suitable software. The description that follows refers to RISC, and in particular RISC-V, by way of example. Generally, RISC 44 is regarded as an example of a processor, and the disclosed techniques can be used with any other suitable processor type.

RISC 44 comprises a processing core 48 (also referred to simply as "core" for brevity) and a memory 52. Core 48 executes instructions in accordance with the RISC's applicable Instruction Set Architecture (ISA). In the present example the ISA is the RISC-V ISA, cited above.

The configuration of NIC 20 depicted in FIG. 1 is an example configuration that is chosen purely for the sake of conceptual clarity. Any other suitable configuration can be used in alternative embodiments. In various embodiments, NIC 20 may be implemented using suitable software, using suitable hardware such as one or more Application-Specific Integrated Circuits (ASIC) or Field-Programmable Gate Arrays (FPGA), or using a combination of hardware and software.

Some elements of NIC 20, e.g., RISC 44, may be implemented using one more general-purpose processors, which are programmed in software to carry out the techniques described herein. The software may be downloaded to the processors in electronic form, over a network, for example, or it may, alternatively additionally, be provided and/or stored on non-transitory tangible media, such as magnetic, optical, or electronic memory.

Fast Processing Of System Calls Using Jump Table

In practical scenarios, the operation of RISC 44 in NIC 20 is predominantly multi-tasking, event-driven operation. On reception, for example, arrival of a packet from network 28 typically causes an event, e.g., an interrupt, which triggers RISC 44 to process the packet. Transmission of a packet to the network is also typically triggered by a similar mechanism. When processing multiple packet flows, possibly associated with multiple hosts, RISC 44 has to perform large numbers of system calls per second. In such an environment, any latency overhead incurred by system calls has a major impact on the performance of NIC 20.

In some embodiments, core 48 of RISC 44 runs kernel-space program code that, among other tasks, serves system calls received from user-space. The kernel-space code is also sometimes referred to as "operating-system code", "kernel-mode code" or "privileged-mode code." A given system call typically comprises a service identifier (ID) that specifies the requested service. The user-space entity issuing the system call (referred to below as "caller" for brevity) typically writes the service ID to a defined register of core 48, and then generates an interrupt.

In response to the interrupt, the kernel-space code reads the service ID, interprets it to determine the required service, and executes the system call accordingly. One way for the kernel-space code to determine the required service is to perform multiple checks (e.g., a sequence of IF commands or CASE command). This solution, however, is time consuming and incurs considerable latency to system-call processing.

In order to reduce this latency overhead, the kernel-space code of RISC 44 processes systems calls using a jump-table mechanism. In some embodiments, the kernel-space code defines, in memory 52, a jump table that is indexed by the service IDs that are specified in system calls. For each valid service ID value, the jump table specifies a respective start address in memory 52 that should be jumped to for serving system calls having that service ID value. In this manner, the kernel-space code is able to start executing the desired code section, which serves the system call, within a single jump instruction.

Figure 2:
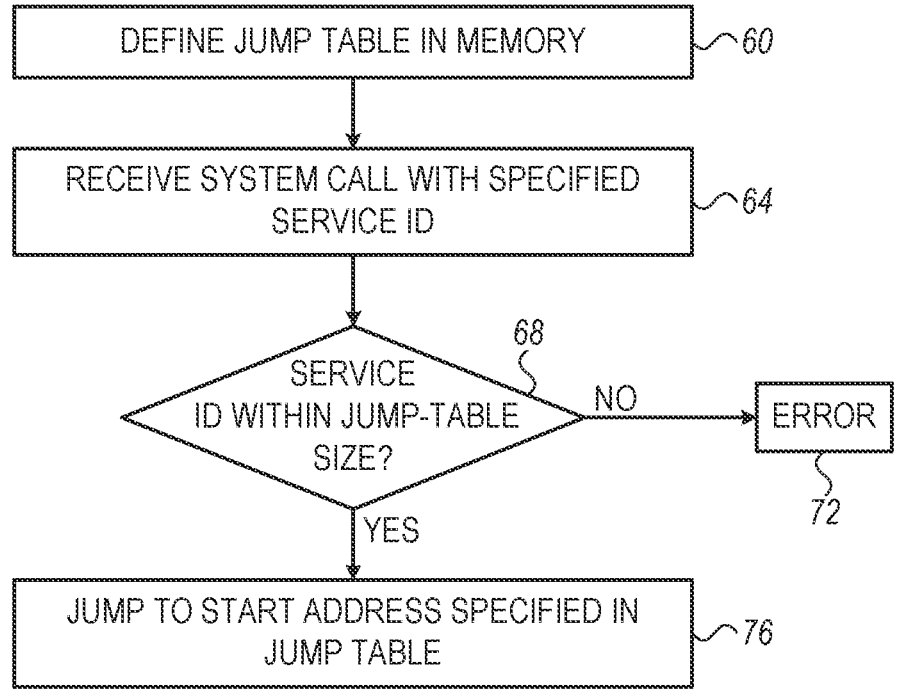
FIG. 2 is a flow chart that schematically illustrates a method for processing system calls, in accordance with an embodiment of the present invention.

FIG. 2 is a flow chart that schematically illustrates a method for processing system calls, in accordance with an embodiment of the present invention. The method begins with the kernel-space code of core 48 defining the above-described jump table in memory 52, at a definition stage 60.

At some point in time, the kernel-space code receives a system call having a specified service ID value, at a triggering stage 64. Typically, the kernel-space code is triggered by an interrupt issued by the caller, after the caller has written the requested service ID in a defined register. In response to the interrupt, the kernel-space code reads the service ID value from the register.

At a validity checking stage 68, the kernel-space code checks whether the service ID value is within the size of the jump table. If not, the method terminates, at an error termination stage 72. Otherwise, once the service ID value is verified to be valid, the kernel-space code jumps to the start address specified in the jump table for that service ID value, at a jumping stage 76. The kernel-space code serves the system call by executing the program code starting from the start address given in the jump table. The process of stages 64-76 is typically repeated for each system call issued to the kernel-space code.

In one example implementation, in the context of RISC-V, the service ID value is written (by the user-space caller) into register x17 of core 48. In response to the interrupt, the kernel-space code reads the value from register x17 and jumps to a base address given by:

$$\text{xtvec}+256+\text{Min}((1<<\text{Log\_Tbl\_size}), x17)<<2)) \qquad \text{Equation 1:}$$

wherein xtvec+256 denotes the base address of the jump table (256 being an example constant offset), Log_Tbl_size denotes the base-2 logarithm of the size of the jump table (i.e., the size of the jump table in bits), and the "<<" denotes a left-shift operator. This operation can also be described by the following pseudo-code:

```
jump_to = xtvec + 256
tbl_size = 1 << Log_Tbl_size // 2^Log_Tbl_size
if ( x17 < tbl_size ) { // if x17 within allowed
range - jump to 4bytes grained offset
    offset = x17 << 2 // x17 * 4
} else {// if x17 out of allowed range jump to last
table entry (default syscall handler)
    offset = tbl_size << 2
}
jump_to = jump_to + offset
jump(jump_to)
```

The condition of Equation 1 guarantees that invalid service ID values will not cause jumps to erroneous addresses. When using this condition, an invalid service ID value will cause a jump to the last table entry, which will cause a jump to the default system call handler.

In some embodiments, the table size Log_Tbl_size is specified in another register. In an embodiment, it is possible to override the jump table mechanism by specifying a table size of zero. In this embodiment, if Log_Tbl_size=0, the kernel-space code jumps to xtvec, and not to the address specified in the jump table according to Equation 1.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A processor, comprising:
a memory; and
a processing core, to:
define, in the memory, a jump table that is indexed by a service identifier and comprises start addresses for respective service identifier values;
receive a system call that specifies a service identifier value; and
serve the system call by querying the jump table, jumping to the start address corresponding to the specified service identifier value, and executing program code starting from the start address,
wherein, prior to querying the jump table, the processing core is to verify whether the specified service identifier value is within a range that does not deviate from the jump table, and, upon finding that the specified service identifier value deviates from the jump table, to jump to the start address corresponding to a last entry of the jump table.

2. The processor according to claim 1, wherein the processing core is to receive the system call by receiving an interrupt and, in response to the interrupt, reading the specified service identifier value from a defined register.

3. The processor according to claim 1, wherein the processing core is a Reduced Instruction Set Computer (RISC) core.

4. A network device, comprising:
a network interface for communicating packets with a network; and
a packet processor, comprising:
a memory; and
a processing core, to:
define, in the memory, a jump table that is indexed by a service identifier and comprises start addresses for respective service identifier values;
receive a system call that specifies a service identifier value; and
serve the system call by querying the jump table, jumping to the start address corresponding to the specified service identifier value, and executing program code starting from the start address,
wherein, prior to querying the jump table, the processing core is to verify whether the specified service identifier value is within a range that does not deviate from the jump table, and, upon finding that the specified service identifier value deviates from the jump table, to jump to the start address corresponding to a last entry of the jump table.

5. The network device according to claim 4, wherein the processing core is to receive the system call by receiving an interrupt and, in response to the interrupt, reading the specified service identifier value from a defined register.

6. The network device according to claim 4, wherein the processing core is a Reduced Instruction Set Computer (RISC) core.

7. A method for processing system calls in a processor, the method comprising:
defining, in a memory, a jump table that is indexed by a service identifier and comprises start addresses for respective service identifier values;
receiving a system call that specifies a service identifier value; and
serving the system call by querying the jump table, jumping to the start address corresponding to the specified service identifier value, and executing program code starting from a start address,
wherein serving the system call further comprises, prior to querying the jump table, verifying whether the specified service identifier value is within a range that does not deviate from the jump table, and, upon finding that the specified service identifier value deviates from the jump table, jumping to the start address corresponding to a last entry of the jump table.

8. The method according to claim 7, wherein receiving the system call comprises receiving an interrupt and, in response to the interrupt, reading the specified service identifier value from a defined register.

9. The method according to claim 7, wherein the processing core is a Reduced Instruction Set Computer (RISC) core.

* * * * *